United States Patent [19]

Kolchinsky et al.

[11] Patent Number: 4,526,340
[45] Date of Patent: Jul. 2, 1985

[54] SOLENOID VALVE

[75] Inventors: Abel E. Kolchinsky, Glenview; Shaukat Kazi, Chicago, both of Ill.

[73] Assignee: Imperial Clevite Inc., Glenview, Ill.

[21] Appl. No.: 392,514

[22] Filed: Jun. 28, 1982

[51] Int. Cl.³ .................. F16K 31/40; F16K 31/42
[52] U.S. Cl. .................................. 251/38; 251/77
[58] Field of Search ............... 251/30, 38, 51, 77, 251/129; 137/269

[56] References Cited

U.S. PATENT DOCUMENTS

| | | | |
|---|---|---|---|
| 1,054,023 | 2/1913 | Niedecken | 137/269 |
| 1,587,921 | 6/1926 | Ray | |
| 2,114,961 | 4/1938 | Gille | 137/139 |
| 2,238,401 | 4/1941 | Shaw | 251/129 |
| 2,251,441 | 8/1941 | Dillman | 137/139 |
| 2,285,323 | 6/1942 | Beekley et al. | 251/38 |
| 2,381,075 | 8/1945 | Nelson | 200/111 |
| 2,392,741 | 1/1946 | Hurlburt | 277/36 |
| 2,612,188 | 9/1952 | Persons | 251/129 |
| 2,616,955 | 11/1952 | Dube et al. | 175/341 |
| 2,665,708 | 1/1954 | Ghormley | 137/493 |
| 2,805,038 | 9/1957 | Towler et al. | 251/28 |
| 2,951,133 | 8/1960 | Davies et al. | 200/87 |
| 2,969,088 | 1/1961 | Kramer | 251/38 |
| 2,990,155 | 6/1961 | Selinder | 251/30 |
| 3,108,777 | 10/1963 | Ray | 251/129 |
| 3,215,902 | 11/1965 | Foley et al. | 317/123 |
| 3,250,293 | 5/1966 | Adams et al. | 137/528 |
| 3,362,679 | 1/1968 | Le Wan | 251/38 |
| 3,469,590 | 9/1969 | Barker | 251/129 X |
| 3,593,241 | 7/1971 | Ludwig | 335/262 |
| 3,818,398 | 6/1974 | Barbier et al. | 335/278 |
| 3,858,841 | 1/1975 | Haynes | 251/30 |
| 4,055,823 | 10/1977 | Andersen | 335/255 |
| 4,074,700 | 2/1978 | Engle | 251/129 |
| 4,270,726 | 6/1981 | Hertfelder et al. | 251/38 |

Primary Examiner—Alan Cohan
Assistant Examiner—John A. Rivell
Attorney, Agent, or Firm—Russell E. Baumann

[57] ABSTRACT

A cartridge solenoid poppet valve (10) arranged to use a single size pilot valve (31) with any one of a set of a plurality of different size sets of valve seat members (14) and poppet valves (24). Pilot guides (175) are provided having different transverse extents to accommodate such different size valve members. The valve further includes a flatted pilot guide (32) defining flow passages communicated between a transfer chamber (35) and a pilot valve chamber (30) in which the pilot valve (31) is disposed. A T-slot (58) is provided in the solenoid plunger (38) extending fully diametrically thereacross and the pilot valve includes a T-shaped connecting head (71) received therein. The plunger (38) and plug (41) define cooperating stop surfaces (67,70) for maintaining a small spacing between the plunger and plug at all times.

12 Claims, 6 Drawing Figures

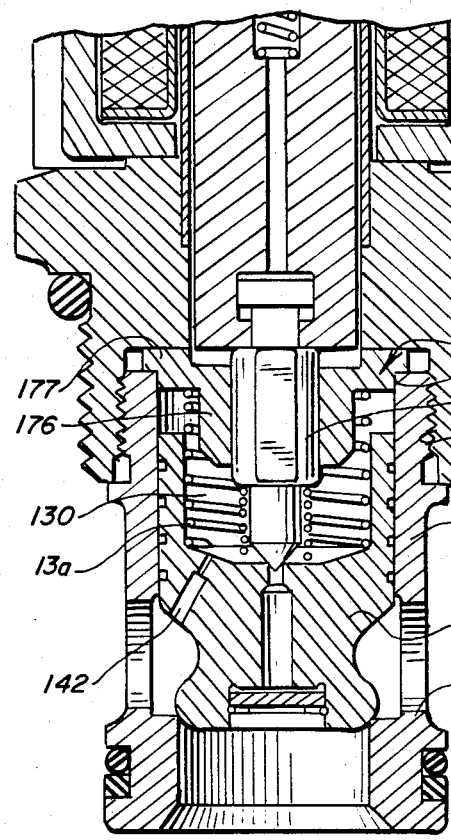
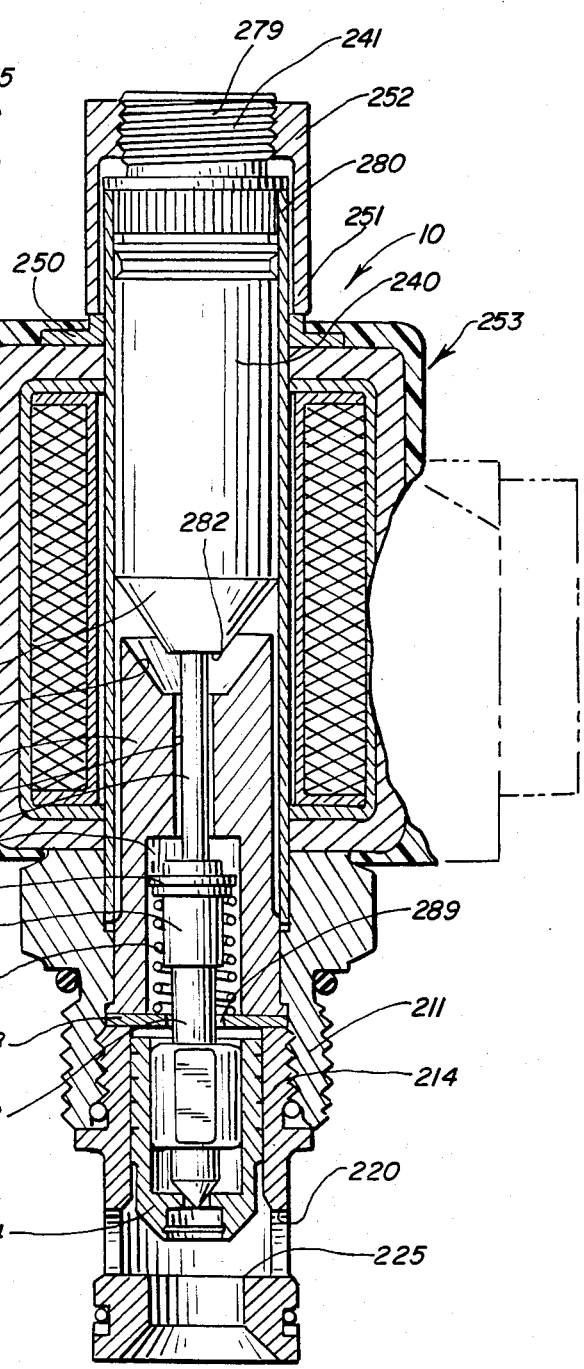
FIG. 5
FIG. 6

4,526,340

SOLENOID VALVE

BACKGROUND OF THE INVENTION

1. Field of the Invention

This invention relates to valves and in particular to solenoid-operated cartridge valves.

2. Description of the Prior Art

In one form of fluid flow control valve, a poppet is seated against a valve seat to close the valve. The poppet is provided with a through bore which is selectively closed by a pilot valve. The poppet is spring-biased to the closed position with fluid pressure acting on opposite sides of the poppet so as to permit the spring biasing to maintain the poppet closed. When the pilot valve is raised from the valve seat, the fluid pressure behind the poppet is relieved to the through bore, thus permitting the fluid pressure acting upwardly on the poppet to move the poppet from the valve seat and thereby permit flow through the valve.

In one form, the pilot valve is operated by a suitable solenoid having a plunger connected to the pilot valve for selective positioning thereof in effecting the desired fluid flow control.

Such valves are provided in a wide range of sizes depending on the flow capacity desired.

It is further conventional to provide such valves in the form of cartridges, including both the valve and the solenoid operator in a single assembly which, illustratively, may be connected to suitable ports by a threaded adapter portion thereof.

SUMMARY OF THE INVENTION

The present invention comprehends an improved solenoid poppet valve structure providing improved performance and economy of manufacture.

The invention comprehends the provision of such a valve having an improved pilot valve guide arranged to utilize the single size pilot valve with any one set of a plurality of different size cooperating sets of valve seat members and poppets, each having the same pilot valve seat configuration.

In the illustrated embodiment, the pilot guide comprises any one of a plurality of pilot guides each having a different lateral extent outturned flange for permitting a single size valve pilot to be utilized with any one of the different size sets of seat members and poppets.

The invention comprehends the provision of such a valve structure wherein the slide portion of the pilot defines a flatted cross section to define flow passages extending longitudinally at the periphery of the slide portion.

In the illustrated embodiment, a pair of flats on diametrically opposite sides of the pilot slide portion is provided.

The invention further comprehends providing a T-slot in the solenoid plunger, with the valve pilot having a connecting head received in the T-slot.

In the illustrated embodiment, the T-slot extends fully diametrically across the plunger.

More specifically, the invention comprehends the provision in a solenoid valve structure having a plunger and a valve pilot for controlling the movement of a main valve poppet, of means in an end portion of the plunger defining a radially extending T-slot, the longitudinal portion of which opens through the end of the plunger, and means on the valve pilot defining a connecting head received in the slot, the T-slot extending fully transversely through the plunger, the longitudinal extent of the longitudinal portion of the T-slot being less than approximately one-half the longitudinal extent of the T-slot.

The connecting head has a transverse extent throughout less than that of the T-slot permitting ready fluid flow past the connecting head into the T-slot.

The pilot guide defines a surface adjacent the end portion of the plunger forming a fluid chamber opening to the longitudinal portion of the T-slot.

The invention further comprehends the provision of a solenoid valve structure having solenoid means defining a plunger chamber, a solenoid plunger reciprocally slidable in the chamber, and valve means connected to the plunger at one end of the plunger chamber defining a tapered surface narrowing to a transverse end surface, means on an adjacent end of the solenoid plunger defining a complementary tapered surface and transverse end surface, passage means in the solenoid plunger for conducting fluid from the portion of the chamber between the surfaces, and means for limiting the movement of the solenoid plunger toward the surface means at one end of the plunger chamber to prevent engagement of the transverse end surfaces and maintain a fluid transfer portion in the plunger chamber between the end surfaces at all times communicating with the passage means.

In the illustrated embodiment, the tapered surfaces are substantially frustoconical.

In the illustrated embodiment, the transverse end surfaces are substantially planar.

The movement limiting means in the illustrated embodiment comprises cooperating stop surfaces on the solenoid plunger and solenoid means at the wide end of the plunger chamber tapered surface.

The cartridge solenoid poppet valve structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 5 is a diametric section of a modified form of cartridge form embodying the invention having a pilot guide adapted for use with different size poppet and seat members; and FIG. 6 is a diametric section of a cartridge valve generally similar to the cartridge valve of FIGS. 1-5, but arranged for normally open operation

DESCRIPTION OF THE PREFERRED EMBODIMENT

Figure 1:
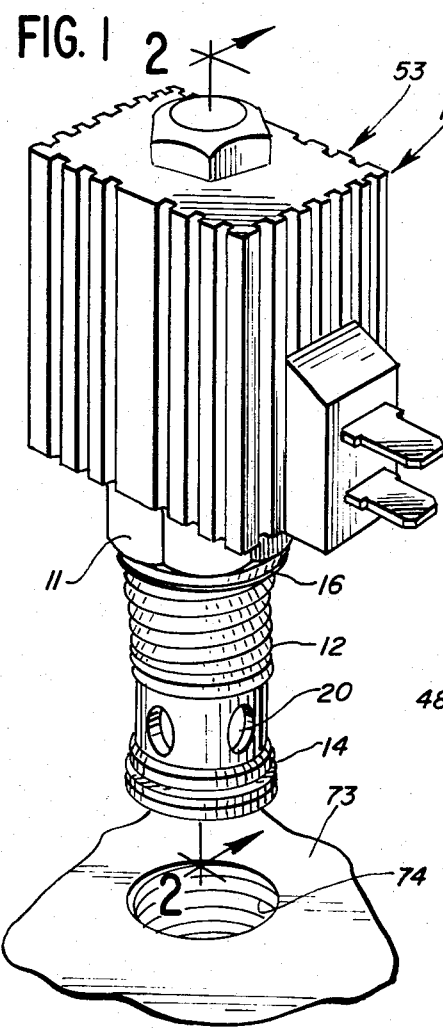
FIG. 1 is a perspective view of a cartridge valve embodying the invention.

In the illustrative embodiment of the invention as disclosed in the drawing, a cartridge solenoid poppet valve generally designated 10 includes an adapter 11 having a threaded portion 12 adapted to be threaded into a fluid port. The adapter includes a threaded end 13. A seat member 14 is provided with a threaded end 15 threaded to the adapter end 13 so as to be received within the fluid port.

A first sealing ring 16 is provided on the adapter and a second sealing ring 17 is provided on the seat member for sealing the valve assembly within the fluid port.

Figure 2:
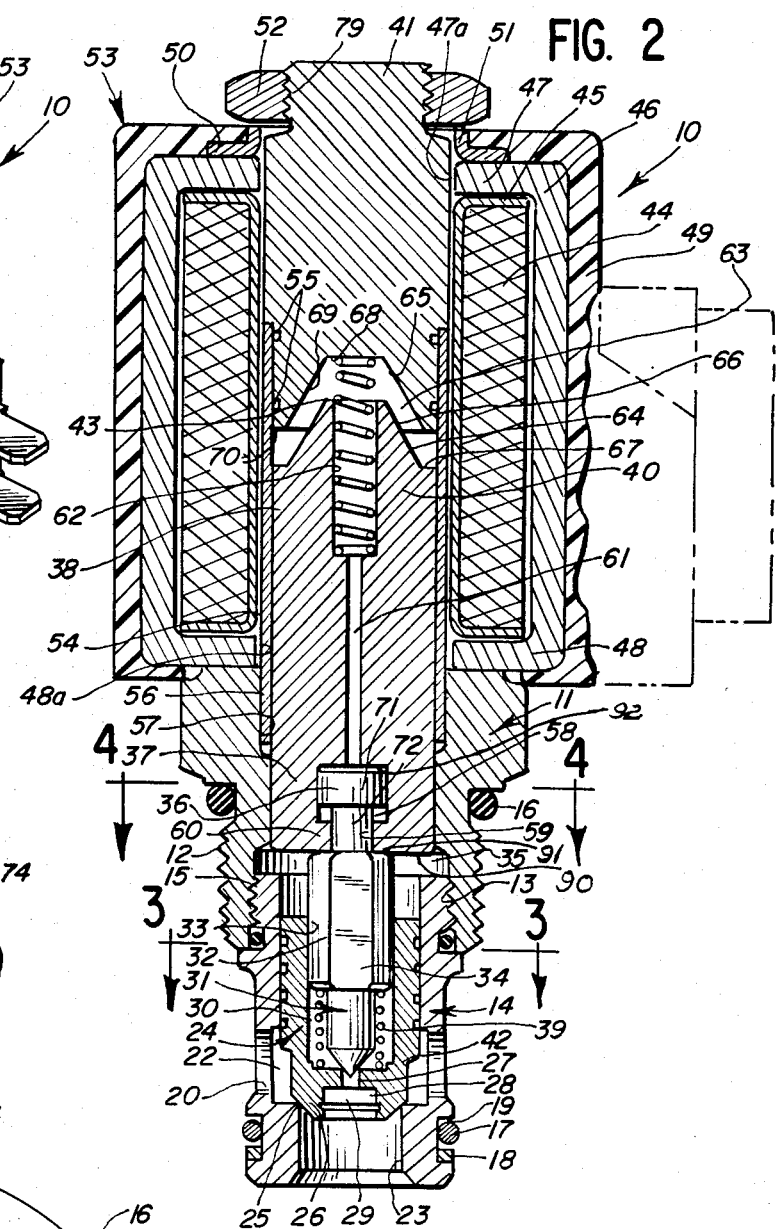
FIG. 2 is an enlarged diametric section thereof.
Figure 4:
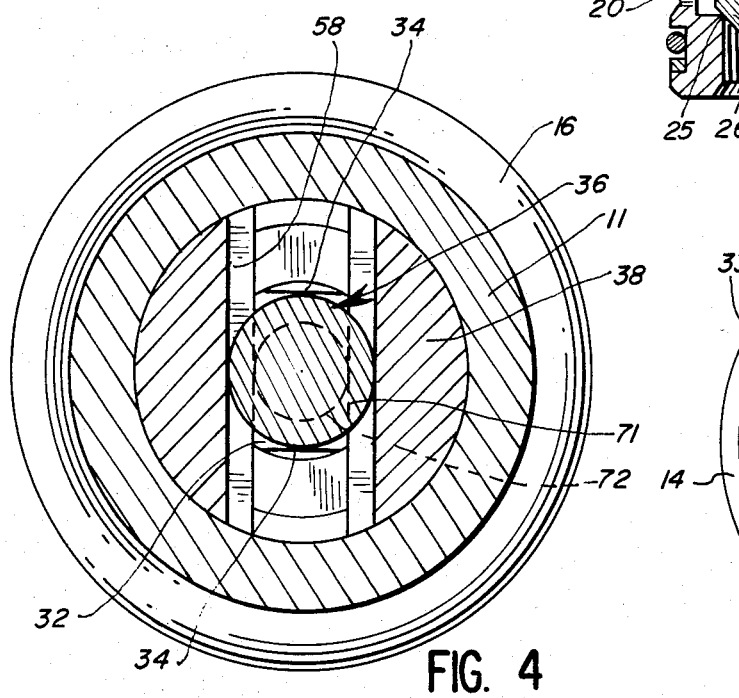
FIG. 4 is a transverse section taken substantially along the line 4—4 of FIG. 2.
Figure 3:
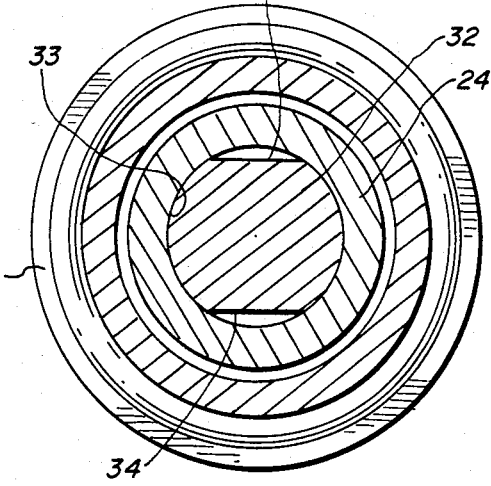
FIG. 3 is a transverse section taken substantially along the line 3—3 of FIG. 2.

As shown in FIG. 2, a backup ring 18 may be associated with the sealing ring 17 in a suitable outwardly opening, annular recess 19 of the seat member.

The seat member is provided with a pair of diametrically opposite inlet openings 20 and 21, which open radially inwardly into a valve chamber 22 within the seat member. An outlet opening 23 opens axially from the valve chamber 22 and is normally closed by a valve member 24 seating on an annular seat 25 of the seat member at the inner end of the outlet port 23.

Thus, when installed in a suitable port member, fluid pressure between seals 16 and 17 is applied through the inlet ports 20 and 21 against the valve member 24. In the illustrated embodiment, valve member 24 comprises a poppet valve having a lower seating portion 26 engaging the valve seat 25 and provided with an axial bore 27 having an outer counterbore 28 receiving a check valve 29. The check valve prevents fluid pressure in the outlet port 23 from causing a reverse flow through the bore 27 into a pilot valve chamber 30 within the valve member 24.

Bore 27 is normally closed by a pilot valve 31 having a slide portion 32 slidably received in an upper cylindrical recess 33 of the valve member 24. The slide portion 32 is provided with a pair of diametrically opposite flats 34 for providing fluid communication between a transfer chamber 35 and the pilot valve chamber 30.

Slide portion 32 acts as a pilot guide and defines an upper end 36 abutting a lower end 37 of a solenoid plunger 38 in the normally closed arrangement of the valve. A helical coil spring 39 extends between the guide portion 32 and the seating portion 26 of valve member 24 to bias the poppet valve downwardly relative to the guide portion 32. As shown in FIG. 2, however, when plunger 38 is in the outermost position with portion 37 thereof abutting the inner end 36 of the pilot guide portion 34, the plunger urges both the pilot valve and the poppet valve 24 outwardly into the seated arrangements of FIG. 2.

In the normally closed arrangements of the solenoid valve 10, the plunger is biased outwardly by a helical coil spring 43 acting between an inner end portion 40 of the plunger and a plug 41. Spring 43 has a strength greater than spring 39 and, thus, overcomes the spring 39 to arrange the valve components in the normally closed position of FIG. 2.

As further illustrated in FIG. 2, valve member 24 is provided with a bleed passage 42 providing communication between the inlet 20 and the pilot valve chamber 30 at all times. Thus, in the normally closed position wherein the pilot valve 31 is closing the pilot opening 27, fluid pressure at the inlet openings 20 is transmitted through the bleed passage 42 into the pilot valve chamber 30 and acts to maintain the poppet valve member 24 in the closed position illustrated in FIG. 2, in cooperation with the springs 43 and 39.

Pilot valve 31 is moved from the seated position illustrated in FIG. 2 by suitable longitudinal movement of plunger 38 inwardly toward plug 41 under the control of a solenoid coil 44. In the illustrated embodiment, the coil 44 is carried in an annular bobbin 45 mounted within an open-sided, generally parallelepiped shaped, enclosing frame 46 having an inner end 47 and an opposite outer end 48. Frame end 47 is provided with an opening 47a inwardly through which plug 41 extends and frame end 48 is provided with an opening 48a outwardly through which plunger 38 extends. The frame is encapsulated in an outer housing 49 which may be formed of a suitable synthetic resin. The space within the frame surrounding the coil may be filled with a suitable synthetic resin, such as an epoxy resin.

A washer 50 is provided in the housing surrounding the upper end of plug 41, and is provided with an axially turned inner end portion 51 extending outwardly to the outer surface of the housing to be engaged by a nut 52 threaded to the distal threaded end 53 of the plug 41.

End 48 of the frame abuts the adapter 11 radially inwardly of the housing 49 and, thus, nut 52 acting through washer 50 and frame 46 effectively clamps the solenoid structure generally designated 53 to the adapter.

As further illustrated in FIG. 2, a slide tube 54 is secured to the plug 41 as by brazing 55 to extend inwardly of the bobbin 45 and includes a lower end portion 56 received in a suitable recess 57 in the adapter 11. Plunger 38 is reciprocably slidable in the tube 54 between the normally closed position of the valve illustrated in FIG. 2, and an open position of the valve wherein the plunger is raised into abutment with plug 41.

Upper end 36 of pilot valve 32 defines a cylindrical head received in a T section transverse slot 58 provided in the lower end of the plunger 38. The stem portion 59 of the slot is relatively short so as to provide high strength in the end portion 60 of plunger 38 confronting the transfer chamber 35.

A fluid flow passage 61 extends from the T-slot upwardly to a recess 62 receiving coil spring 43 and opening to the space 63 between the upper end 64 of plunger 40 and the lower end 65 of plug 41.

Illustrated in FIG. 2, surface 64 of the plunger is defined by a radially inner frustoconical portion 66 and a radially outer annular planar portion 67. Surface 65, in turn, is defined by a planar radially inner portion 68, a frustoconical midportion 69 and an annular planar outer portion 70.

The length of frustoconical surface portion 66 is made to be slightly less than the length of frustoconical surface portion 69 of plug 41 so that when the plunger is moved inwardly upon energization of the coil 44, surface 67 of the plunger abuts surface 70 of the plug, with the plunger remaining spaced from the planar surface 68 of the plug, thereby to avoid entrapment of fluid in the space 63 upon energization of the solenoid.

Fluid may flow freely from space 63 upon such energization of the solenoid downwardly through recess 62 and passage 61 into T-slot 58. End portion 36 of the pilot valve includes a cylindrical head portion 71 and a reduced diameter cylindrical stem portion 72 connected to the slidable guide portion 32 of the pilot valve. Stem portion 72 has clearance with the plunger portion 60 within the stem portion 59 of the T-slot so that fluid may flow freely downwardly past the stem portion 72 of the pilot valve end portion into the transfer chamber 35.

As indicated above, the slidable guide portion 32 of the pilot valve is provided with at least a pair of diametrically opposite flats 34 defining flow passages for permitting flow of the entrapped fluid outwardly therethrough into the pilot valve chamber 30 for delivery with the fluid flowing through the valve in the open condition of the valve.

As shown in FIG. 2, outer end surface 90 of the plunger is urged against an inner end surface 91 of guide portion 32 of the pilot valve. As shown, the axial length of head 71 and stem 72 of guide portion 36 is less than the spacing between surface 90 and the inner end 92 of T-slot 58 to provide clearance with the guide head 71 to permit fluid flow between flow passage 61 and T-slot 58 at all times.

By maintaining the plunger spaced from end surface 68 at all times, entrapment of fluid between the plunger and plug is effectively prevented. By providing the improved fluid flow passages, including the diametrically extending T-slot and the flats on the guide portion 32 of the pilot valve, improved free movement of the pilot valve is provided for improved functioning of the valve structure 10.

The solenoid valve 10 is adapted, as indicated above, to be mounted to a port, such as port 73 illustrated in FIG. 1, having a threaded opening 74 to which threaded portion 12 of the adapter 11 is threaded, with the seat member 14 disposed innermost within the port opening. As indicated above, sealing ring 16 seals the valve to the port about the opening 74 and the O-ring 17 seals the seat member to the port within the opening to provide a sealed fluid passage through the valve within the port.

As illustrated in FIG. 5, the invention further comprehends the provision of a modified form of poppet valve generally designated 110 similar to poppet valve 10 but wherein the pilot valve guide portion 132 is slidably received in a pilot guide 175 clamped between the seat member 114 and the adapter 111.

Thus, as more specifically illustrated in FIG. 5, pilot guide 175 includes a radially inner portion 176 slidably receiving the pilot valve guide portion 132, and an annular outturned portion 177 defining a radially and axially outwardly opening annular corner recess 178 seating against the inner end of the seat member 114 when the seat member is threaded fully into the adapter threaded end 113.

As shown in FIG. 5, the pilot valve spring 139 extends between the outturned portion 177 of the pilot guide and the outer end of the poppet valve member 124.

The pilot valve member is provided with a bleed passage 142 providing communication at all times between the inlet 120 and the pilot valve chamber 130.

The combination of the pilot guide 175, poppet valve member 124 and seat member 114 illustrated in FIG. 5 comprises one set of a plurality of different size cooperating sets of such adapters, poppet valve members and seat members each having the same pilot valve seat configuration so that the same pilot valve structure may be used with a line of valves differing only in the flow capacity provided by the different size poppet valves and seat members. Thus, the pilot guides may be adapted for such a wide range of valve capacities by varying the radial extent of the outturned portion 177 to mate with the selected seat member 114 and complementary valve member 124.

Other than for the use of the pilot guide 175 providing for adaption of the solenoid valve structure to a wide range of different size fluid control valves utilizing the same pilot valve configuration, poppet valve structure 110 is similar to poppet valve structure 10 and functions in a similar manner.

Referring now to the embodiments of FIG. 6, a poppet valve generally similar to poppet valve 10 but arranged to function in a normally open manner, is shown to comprise a poppet valve structure generally designated 210. The solenoid structure 253 is generally similar to solenoid structure 53 except that a threaded cap 252 is provided on the threaded end 279 of the plug 241 fitting to a projecting end 280 of the slide tube.

The plunger 240 is slidably received in the slide tube within the solenoid structure 253. The plunger defines an outer frustoconical end 281 having a planar distal end surface 282. A pilot housing 283 is retained coaxially within the outer end of the slide tube and defines a frustoconical recess 284 complementary to the frustoconical end 281 of the plunger.

The pilot housing further defines a through bore 285 opening outwardly into the pilot chamber 230.

Pilot valve 231 includes an inwardly projecting rod 286 which extends inwardly into abutment with the plunger surface 282, as shown in FIG. 5.

The pilot valve further defines an annular flange 287. A pilot valve biasing spring 239 is seated inwardly against flange 287 and outwardly against a spring retainer plate 288 clamped between the seat member 214 threaded to the adapter 211.

The pilot valve stem 272 extends outwardly through a suitable opening 289 in the spring retainer plate.

Spring 239 normally biases the pilot valve inwardly permitting fluid pressure from inlet openings 220 to urge the poppet valve 224 from the valve seat 225. However, when solenoid structure 253 is energized, the plunger 240 is urged outwardly moving the pilot valve rod 286 outwardly and thereby urging the pilot valve outwardly against the poppet valve 224 so as to move the poppet valve into seated relationship with valve seat 225, thereby closing the valve.

Thus, the normally open valve structure 210 is similar to the normally closed valve structure except for the rearrangement of the parts to provide the normally open functioning.

As discussed above, each of valve structures 110 and 210 is generally similar in structure and functioning to valve structure 10 and similar elements thereof are identified by similar reference numerals except for being 100 and 200 higher, respectively.

The foregoing disclosure of specific embodiments is illustrative of the broad inventive concepts comprehended by the invention.

We claim:

1. In a solenoid valve structure having a solenoid plunger having an axial bore, and a valve pilot for controlling the movement of a main valve poppet, the improvement comprising:

means in an end portion of the plunger defining a radially extending T-slot, the head portion of the T-slot opening to said plunger bore and the stem portion of the T-slot opening longitudinally through the end portion of the plunger;

means on said valve pilot defining a connecting head received in said slot, the head portion of said T-slot extending fully transversely through the plunger; and means for preventing said connecting head of the valve pilot from closing said plunger bore in said head portion of the T-slot, said means for preventing said connecting head from closing said plunger bore comprising means for maintaining said connecting head spaced from said plunger about the opening of said bore to said T-slot.

2. In a solenoid valve structure having a solenoid plunger having an axial bore, and a valve pilot for controlling the movement of a main valve poppet, the improvement comprising:

means in an end portion of the plunger defining a radially extending T-slot, the head portion of the T-slot opening to said plunger bore and the stem portion of the T-slot opening longitudinally through the end portion of the plunger;

means on said valve pilot defining a connecting head received in said slot, the head portion of said T-slot extending fully transversely through the plunger; and means for preventing said connecting head of the valve pilot from closing said plunger bore in said head portion of the T-slot, said means for preventing said connecting head from closing said plunger bore comprising cooperating means on said valve pilot and plunger at said stem portion of the T-slot for maintaining said connecting head spaced from said plunger about the opening of said bore to said T-slot.

3. The solenoid valve structure of claim 1 further including a solenoid operator, a seat member defining an annular valve seat, an adapter mounting said seat member to the solenoid operator, a poppet coaxially slidable in said seat member and having a control flow passage opening through a pilot valve seat, means responsive to the solenoid operator for selectively moving said valve pilot toward and from said pilot valve seat for selectively closing and opening said control flow passage, means on said pilot guide defining a slide portion, and a pilot guide having a through bore slidably receiving said slide portion of said valve pilot and having a radially outturned flange clamped between said valve seat and adapter, said valve seat member and poppet comprising any one set of a plurality of different size cooperating sets of valve seat members and poppets each having the same valve seat configuration, and said pilot guide comprising any one of a plurality of pilot guides each having a different lateral extent of an outturned flange thereof, each pilot guide being arranged to receive the same size valve pilot to permit the valve to be utilized with any one of the different size sets of seat members and poppets and a single size valve pilot.

4. The valve structure of claim 3 wherein said slide portion of the valve pilot defines a flatted cross section and said pilot guide through bore in which said slide portion is slidably received is cylindrical.

5. The valve structure of claim 3 wherein said slide portion of the valve pilot defines a flatted cross section having rounded corners, and said pilot guide through bore in which said slide portion is slidably received is cylindrical.

6. The valve structure of claim 3 wherein said slide portion of the valve pilot defines a flatted cross section having rounded corners, and said pilot guide through bore in which said slide portion is slidably received is cylindrical, the rounded corners having a diameter slightly smaller than that of said cylindrical bore.

7. The valve structure of claim 3 wherein said slide portion of the valve pilot defines a polygonal cross section and said pilot guide through bore in which said slide portion is slidably received is cylindrical.

8. The valve structure of claim 3 wherein said outturned flange defines an annular peripheral recess receiving a complementary corner of the valve seat member for accurately coaxially centering the pilot guide relative to the coaxial seat member and poppet.

9. The valve structure of claim 3 wherein said pilot guide defines a recess for conducting fluid to and from the spaces between the valve pilot and the pilot guide in said through bore as an incident of the sliding movement of the valve pilot in said slide portion of the through bore.

10. The solenoid valve structure of claim 1 further including a poppet valve having a control port, and a pilot valve for selectively closing said control port, means on the valve pilot defining a generally cylindrical slide portion, guide means on said poppet valve slidably receiving said slide portion of the valve pilot, and means defining a substantially unrestricted flow path from said plunger, and between said slide portion and guide means to said control port.

11. The solenoid-operated valve of claim 10 further including a slide tube in which said plunger is reciprocably slidable, said slide tube defining an inner end, plug means for closing said inner end of the slide tube, and means on said plunger and plug for limiting movement of the plunger toward the plug means to define at all times a fluid chamber between the plunger and plug means.

12. The solenoid-operated valve of claim 10 wherein said valve pilot defines at least one peripheral, longitudinally extending flat defining with the poppet valve the portion of said flow path between said slide portion and guide means.

* * * * *